(12) United States Patent
Schweitzer et al.

(10) Patent No.: US 12,521,124 B2
(45) Date of Patent: Jan. 13, 2026

(54) MEDICAL INSTRUMENT AND METHOD FOR PRODUCING A MEDICAL INSTRUMENT

(71) Applicant: Aesculap AG, Tuttlingen (DE)

(72) Inventors: Tom Schweitzer, Tuttlingen (DE);
Janina Ackermann, Tuttlingen (DE);
Thomas Schmid, Messkirch (DE);
Andreas Deutschendorf, Spaichingen (DE)

(73) Assignee: Aesculap AG, Tuttlingen (DE)

( * ) Notice: Subject to any disclaimer, the term of this patent is extended or adjusted under 35 U.S.C. 154(b) by 520 days.

(21) Appl. No.: 17/955,777

(22) Filed: Sep. 29, 2022

(65) Prior Publication Data

US 2023/0013129 A1    Jan. 19, 2023

Related U.S. Application Data

(63) Continuation of application No. PCT/EP2021/057874, filed on Mar. 26, 2021.

(30) Foreign Application Priority Data

Mar. 31, 2020 (DE) .................... 10 2020 108 902.3

(51) Int. Cl.
*A61B 17/16* (2006.01)
*A61B 17/00* (2006.01)

(52) U.S. Cl.
CPC .............. *A61B 17/1604* (2013.01); *A61B 2017/00424* (2013.01); *A61B 2017/0046* (2013.01); *A61B 2017/00526* (2013.01)

(58) Field of Classification Search
CPC ...... A61B 17/1604; A61B 2017/00424; A61B 2017/0046; A61B 2017/00526
See application file for complete search history.

(56) References Cited

U.S. PATENT DOCUMENTS 6,709,439 B2    3/2004   Rogers et al.
10,485,558 B1 *  11/2019   Cook .................. A61B 10/025
(Continued)

FOREIGN PATENT DOCUMENTS

AT         5119 B      9/1901
CN      108697431 A    10/2018
(Continued)

OTHER PUBLICATIONS

Search Report received in International Application No. PCT/EP2021/057874 dated Jun. 28, 2021, with translation, 5 pages.
(Continued)

*Primary Examiner* — Kevin T Truong
*Assistant Examiner* — Diana Jones
(74) *Attorney, Agent, or Firm* — Christopher A. Rothe; CM Law

(57) ABSTRACT

A medical instrument, for example an impact instrument, and a method for producing a medical instrument. The medical instrument includes a proximal end and a distal end. A handle and a striking face facing in a proximal direction are arranged or formed on the proximal end. A tool instrument is arranged or formed on the distal end. An instrument shaft of the instrument extends from the proximal end to the tool element. The handle is configured in the form of a hollow handle.

18 Claims, 6 Drawing Sheets

(56) References Cited

U.S. PATENT DOCUMENTS

| | | | |
|---|---|---|---|
| 10,695,194 B2* | 6/2020 | Robinson | A61F 2/4611 |
| 10,702,286 B2 | 7/2020 | Hirt et al. | |
| 11,154,402 B1* | 10/2021 | LaNeve | A61B 17/92 |
| 2005/0090829 A1 | 4/2005 | Martz et al. | |
| 2006/0178673 A1* | 8/2006 | Curran | A61B 17/92 |
| | | | 606/100 |
| 2007/0256276 A1 | 11/2007 | Holland-Letz | |
| 2008/0064929 A1* | 3/2008 | Wiedenbein | A61B 17/2909 |
| | | | 600/101 |
| 2009/0112219 A1* | 4/2009 | Daniels | A61F 2/4607 |
| | | | 606/99 |
| 2010/0305624 A1 | 12/2010 | Lozier et al. | |
| 2015/0239117 A1 | 8/2015 | Gauthier et al. | |
| 2016/0157871 A1 | 6/2016 | Overes et al. | |
| 2018/0345464 A1 | 12/2018 | Chang | |

FOREIGN PATENT DOCUMENTS

| | | |
|---|---|---|
| CN | 210189689 U | 3/2020 |
| DE | 109268 A | 9/1898 |
| DE | 7530436 U1 | 7/1979 |
| DE | 3801676 C1 | 7/1989 |
| DE | 19616349 A1 | 11/1997 |
| DE | 19616350 A1 | 11/1997 |
| DE | 19616352 A1 | 11/1997 |
| DE | 19905587 A1 | 8/2000 |
| DE | 102008064517 A1 | 6/2010 |
| DE | 202013004295 U1 | 6/2013 |
| EP | 3566666 B1 | 11/2019 |
| JP | 2003169812 A | 6/2003 |
| WO | 2014091454 A1 | 6/2014 |
| WO | WO-2019215244 A1 * 11/2019 ........... A61F 2/4607 |  |

OTHER PUBLICATIONS

Written Opinion received in International Application No. PCT/EP2021/057874 dated Jun. 28, 2021, with translation, 14 pages.
Office Action received in Chinese Application No. 202180039248.7 dated Jun. 25, 2025, with translation, 13 pages.
Office Action received in Japanese Application No. 2022-559737 dated Oct. 22, 2024, with translation, 12 pages.

* cited by examiner

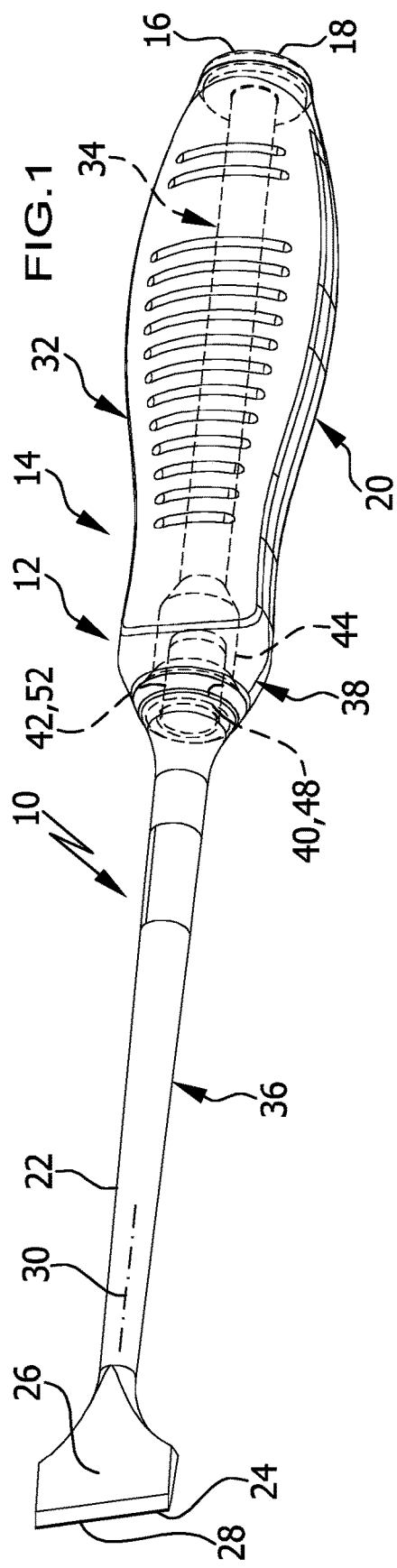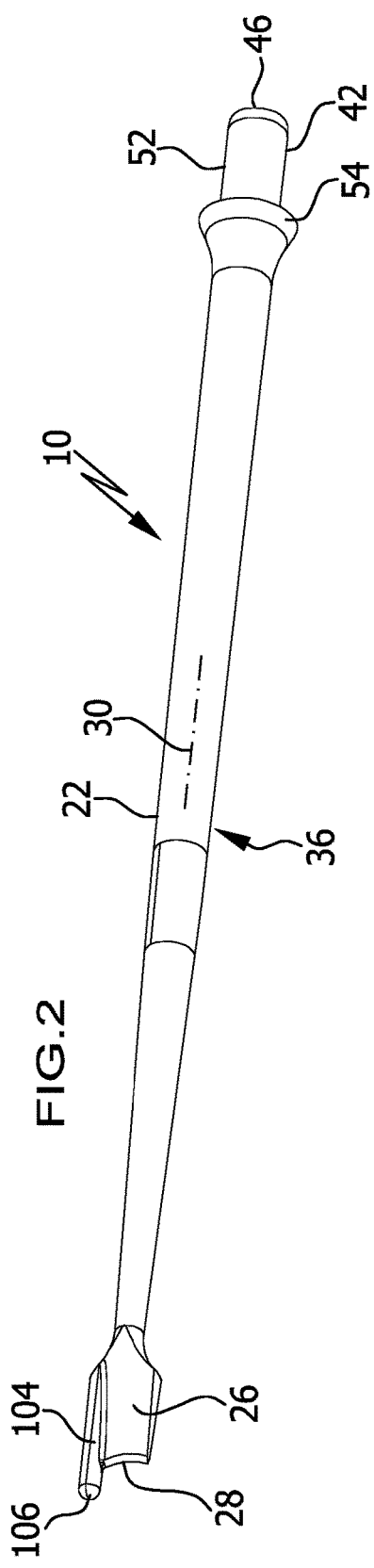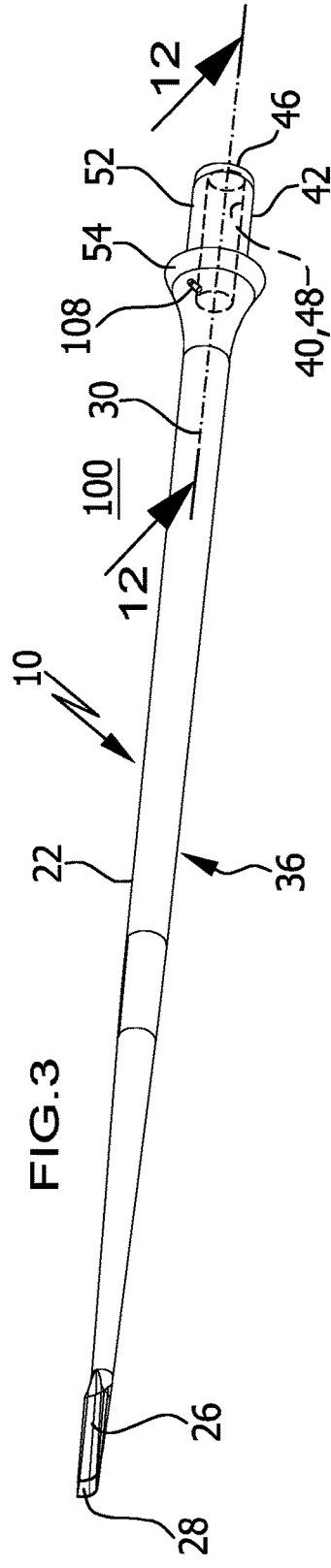

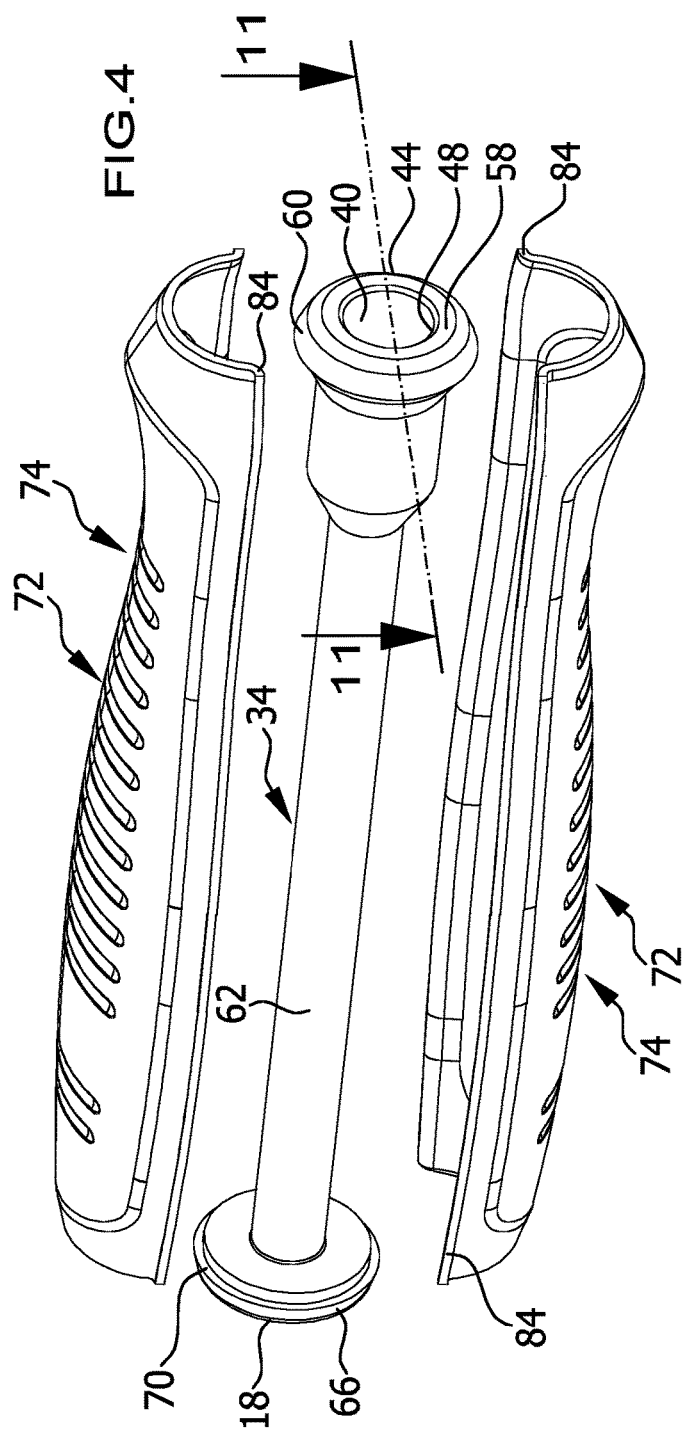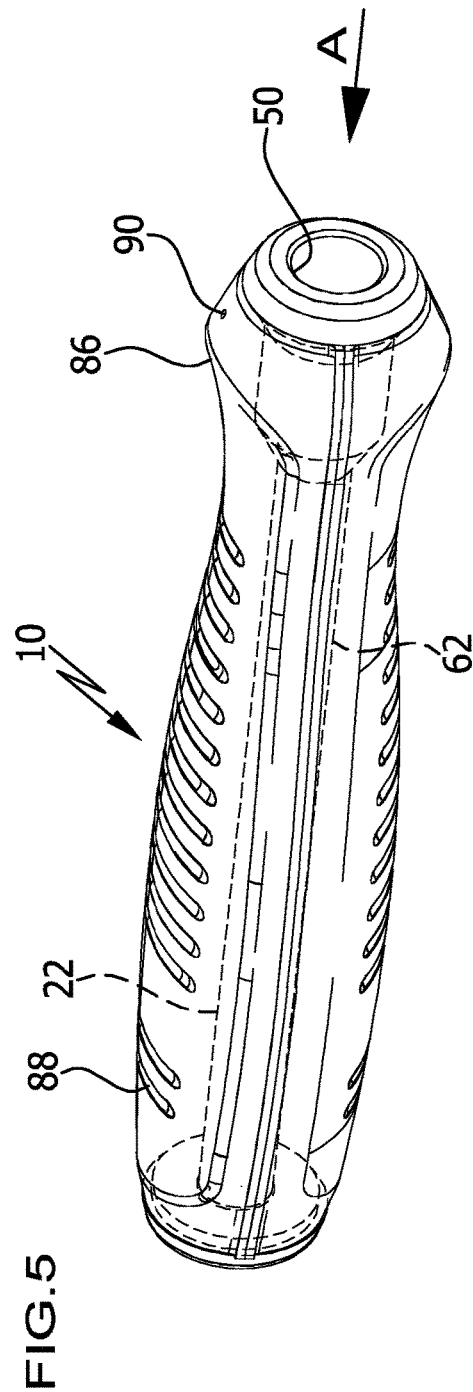

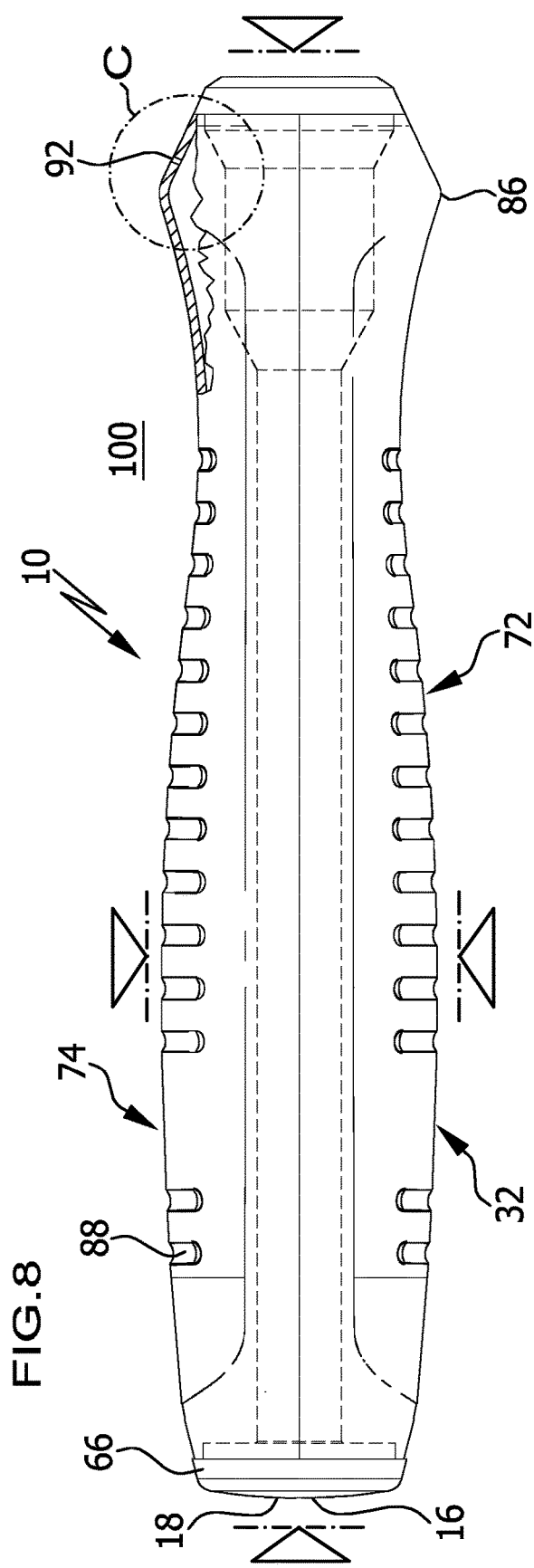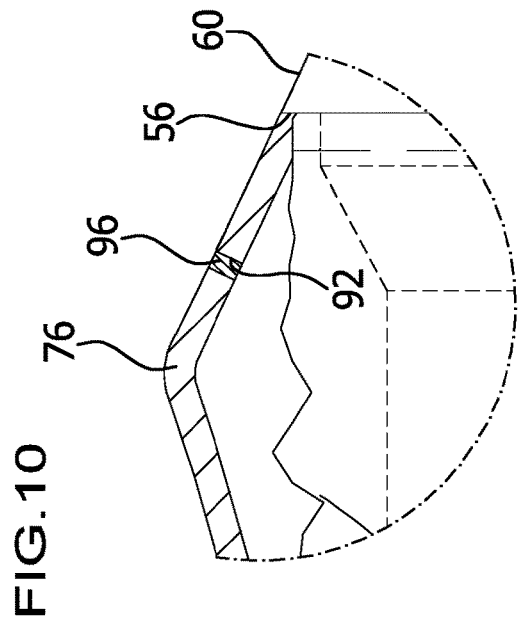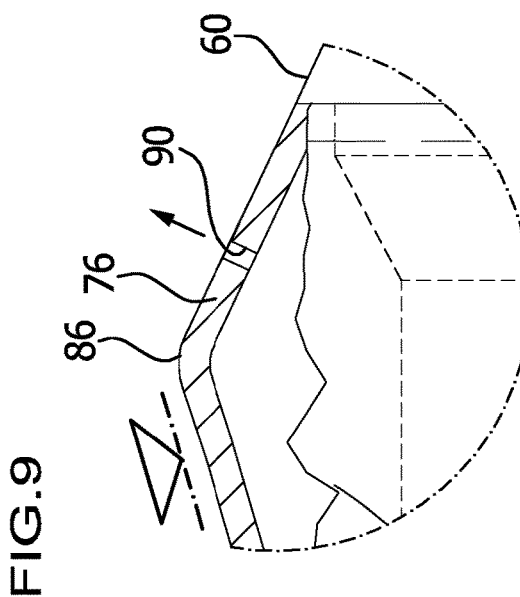

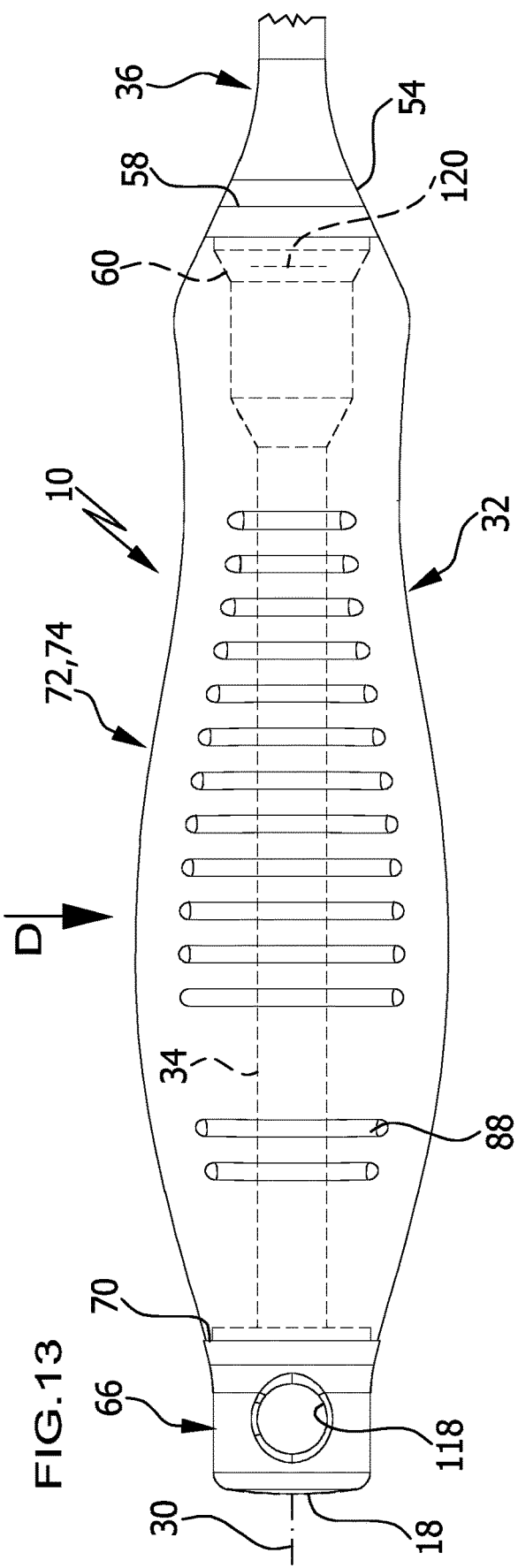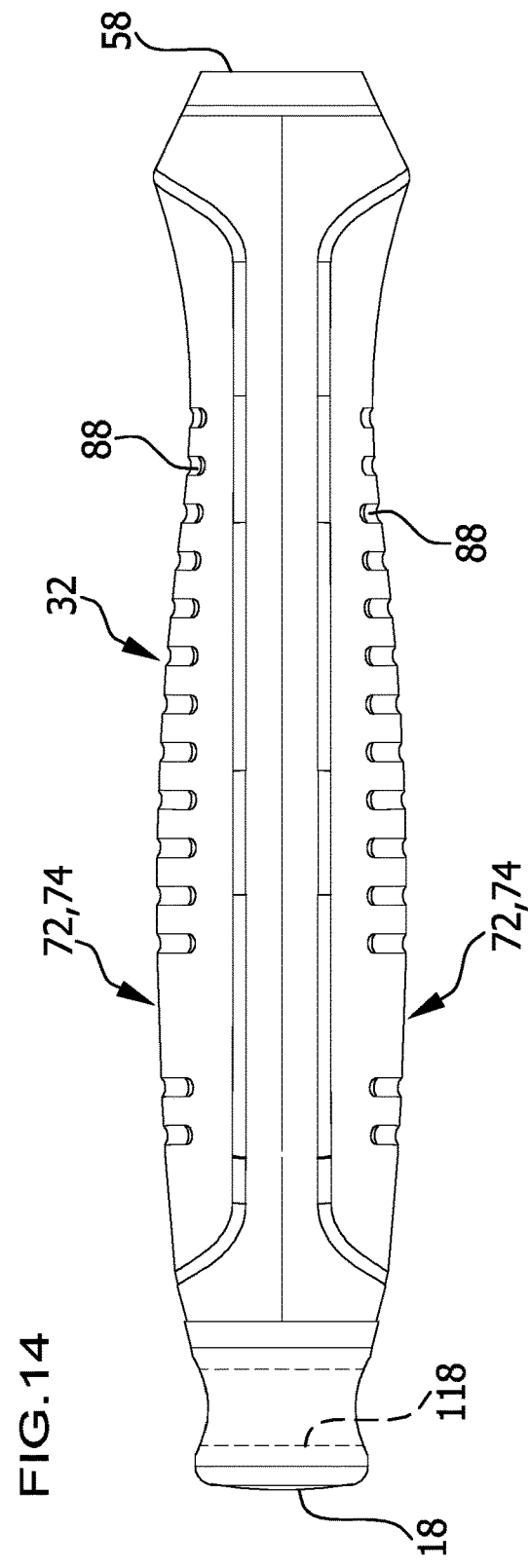

MEDICAL INSTRUMENT AND METHOD FOR PRODUCING A MEDICAL INSTRUMENT

CROSS-REFERENCE TO RELATED APPLICATIONS

This application is a continuation of international application number PCT/EP2021/057874 filed on Mar. 26, 2021 and claims priority to German application number 10 2020 108 902.3 filed on Mar. 31, 2020. The contents of international application number PCT/EP2021/057874 and German application number 10 2020 108 902.3 are incorporated herein by reference in their entirety and for all purposes.

FIELD

The present disclosure relates to medical instruments generally, and more specifically to a medical instrument, in particular an impact instrument, with a proximal end and a distal end, wherein a handle and a striking face facing in the proximal direction are arranged or formed on the proximal end, wherein a tool element is arranged or formed on the distal end, and wherein an instrument shaft of the instrument extends from the proximal end to the tool element.

Furthermore, the present disclosure relates to methods for producing medical instruments generally, and more specifically to a method for producing a medical instrument, in particular an impact instrument, with a proximal end and a distal end, wherein a handle and a striking face facing in the proximal direction are arranged or formed on the proximal end, wherein a tool element is arranged or formed on the distal end, and wherein an instrument shaft of the instrument extends from the proximal end to the tool element.

BACKGROUND

Medical instruments of the kind described at the outset are known, e.g., in the form of orthopedic instruments. They are used, for example, as impact instruments in the form of osteotomes, chisels and the like. Due to the use as impact instruments, there is an increased requirement for the mechanical stability of the instrument, namely in particular due to impact, torsional, or bending stresses.

A problem with such instruments is, in particular, their handles. For example, steel handles of solid configuration are very heavy. Handles that are made of plastic or are coated with plastic are typically not durable for a long time considering the hard reprocessing conditions for medical instruments.

A medical instrument as described at the outset is disclosed in DE 20 2013 004 295 U1. The handle thereof has large recesses that are difficult to clean. Further, the recesses define large openings on the handle so that about 50% of an outer surface of the handle is missing. This makes the handling of such instruments uncomfortable for a surgeon. Moreover, the edges along the openings require thorough and elaborate treatment in order to completely remove any burrs or ridges. Such burrs and ridges are a potential danger for damaging gloves used by surgeons and for causing harm to surgeons' hands.

DE 38 01 676 C1 relates to a pneumatic rasp having an oscillating driven piston. Such an instrument has neither a striking face facing in the proximal direction arranged or formed on the proximal end of the instrument nor an instrument shaft of the instrument which extends from the proximal end of the instrument to the tool element. Further, as the piston is designed for reciprocation in a cylinder, the space defined by the cylinder cannot be perfectly sealed so that such an instrument is very hard to clean and to sterilize.

SUMMARY

In a first aspect of the disclosure, a medical instrument is provided, in particular in the form of an impact instrument. The instrument has a proximal end and a distal end. A handle and a striking face facing in the proximal direction are arranged or formed on the proximal end. A tool instrument is arranged or formed on the distal end. An instrument shaft of the instrument extends from the proximal end to the tool element. The handle is configured in the form of a hollow handle.

In a second aspect of the disclosure, a method for producing a medical instrument is provided, in particular for producing an impact instrument. The instrument is provided with a proximal end and a distal end. A handle and a striking face facing in the proximal direction are arranged or formed on the proximal end. A tool element is arranged or formed on the distal end. An instrument shaft of the instrument is provided so as to extend from the proximal end to the tool element. The handle is produced in the form of a hollow handle.

BRIEF DESCRIPTION OF THE DRAWING FIGURES

The foregoing summary and the following description may be better understood in conjunction with the drawing figures, of which:

FIG. 1 shows a partially broken depiction of a first embodiment of a medical instrument;

FIG. 2 shows a perspective view of a further embodiment of a tool part;

FIG. 3 shows a partially broken perspective view of a further embodiment of a tool part;

FIG. 4 shows a schematic exploded depiction of an embodiment of a handle part;

FIG. 5 shows a schematic, partially broken view of a further embodiment of a handle part;

FIG. 8 shows a schematic perspective, partially broken and cut view of the handle part from FIG. 7;

FIG. 9 shows an enlarged view of the region C from FIG. 8 during hardening of the handle part;

FIG. 10 shows an enlarged view of the region C after hardening with a closed vent opening;

FIG. 13 shows a schematic side view of part of a further embodiment of a medical instrument; and FIG. 14 shows a view of the handle part from FIG. 13 in the direction of arrow D.

DETAILED DESCRIPTION

Figure 6:
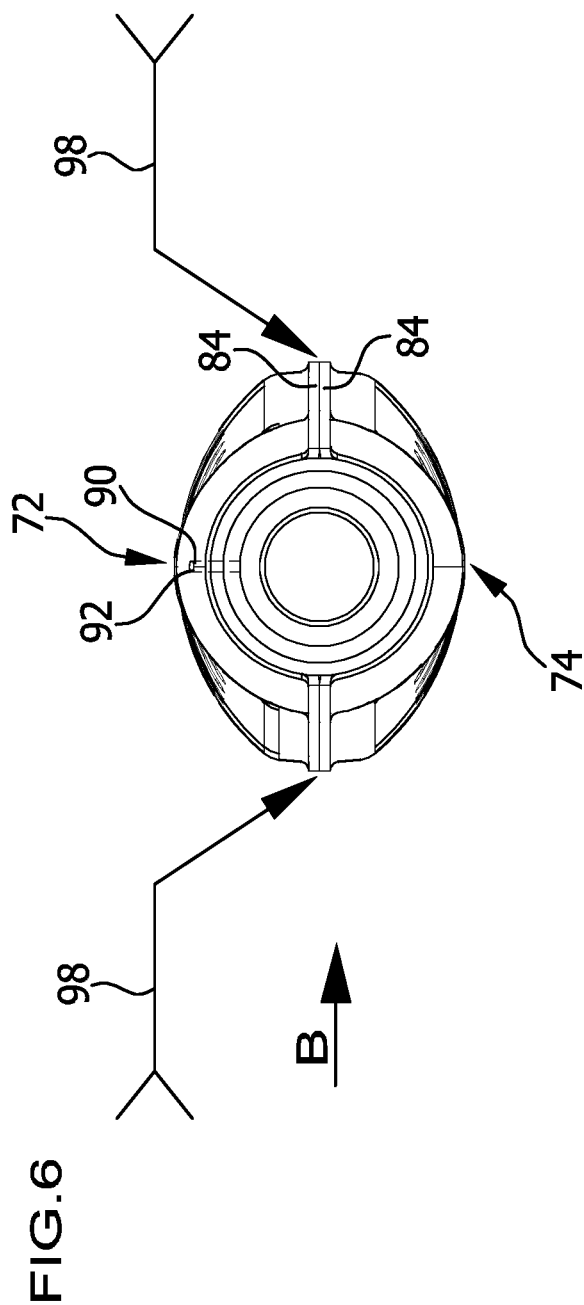
FIG. 6 shows a view of the handle part from FIG. 5 in the direction of arrow A.

Although the present disclosure is illustrated and described herein with reference to specific embodiments, the present disclosure is not intended to be limited to the details shown. Rather, various modifications may be made in the details without departing from the disclosure.

The present disclosure relates to a medical instrument, in particular an impact instrument, with a proximal end and a distal end, wherein a handle and a striking face facing in the proximal direction are arranged or formed on the proximal end, wherein a tool instrument is arranged or formed on the distal end, and wherein an instrument shaft of the instrument extends from the proximal end to the tool element, wherein the handle is configured in the form of a hollow handle.

Further developing a medical instrument of the kind described at the outset in the proposed manner has the advantage, in particular, that a weight of the handle can be significantly reduced, in particular even if the handle, i.e., the hollow handle, is made entirely of one or more metallic materials. In particular, such an instrument can be configured with a continuous instrument shaft, which is also referred to as the core of the instrument. If the core is made of a metallic material, in particular, instrument shafts resistant to torsion, bending, and impact can be formed, so that such an instrument can also be used, for example, as an impact instrument. An impact pulse impacting the striking face can thus be passed directly through the instrument shaft to the distal end, i.e., to the tool element. A hollow handle is not of solid configuration, so that weight can be saved by one or more cavities formed at the handle. This enables, in particular, a surgeon to use the instrument over a longer period of time without tiring in order to be able to transmit the forces necessary for a surgical procedure. The hollow handle in the sense of the present disclosure is substantially closed so that an outer surface of the hollow handle completely or at least substantially remains. Substantially in this sense means that not more than 10%, preferably not more than 1%, of the outer surface is removed or opened so that a self-contained or substantially self-contained cavity or hollow space is defined and enclosed by an outer wall of the hollow handle. The outer wall defines the outer surface of the hollow handle. Further, the outer wall surrounds the core completely or substantially completely. In other words: the hollow handle is in the form of a handle enclosing a cavity or hollow space. The handles disclosed in DE 20 2013 004 295 U1 are not in the form of hollow handles as proposed by the present disclosure. Rather, these handles are provided with recesses defining large openings.

It is favorable if the hollow handle comprises at least one, in particular two, handle shells surrounding the instrument shaft and if a cavity is formed between the at least one handle shell and the instrument shaft. The cavity may be configured, in particular, in the form of an annular space. A handle shell may be formed, for example, from a hollow piece by so-called hydroforming. Providing two, three, or more handle shells simplifies, in particular, the production of the instrument. The at least one handle shell can be permanently connected to the instrument by suitable connecting methods.

It is advantageous if the cavity is closed in a gas-tight manner. In particular, it can be closed by welding and/or by a closure element. A cavity closed in a gas-tight manner prevents contaminants from collecting in the cavity. In other words, a cleanability of the instrument can be improved by the gas-tight closure.

It is favorable if the instrument comprises a vent opening that fluidically connects the cavity of the hollow handle to an environment of the instrument and if the vent opening is closed. In particular, the vent opening is closed in a gas-tight manner. Such a vent opening is advantageous in particular in the production of such an instrument. If the components are first connected together and then the instrument as a whole is subjected to a hardening process at high temperatures, for example about 1000° C., the air contained in the cavity can expand due to the heat. This then leads, in particular, to the, for example, ergonomically shaped handle shells of the hollow handle being able to deform in an undesirable manner when hardening due to the gas pressure arising in the cavity. The vent opening provides a relief. In particular, said vent opening is closed again after hardening the instrument in order to close off the cavity of the hollow handle from an environment of the instrument, in particular in a gas-tight manner.

The vent opening can be closed in a simple manner with a closure element and/or by soldering or welding. Both an initially provided vent opening and the manner in which it was closed for example after hardening the instrument can be determined in a simple manner on an instrument ready for use, for example by destroying the instrument in the region of the hollow handle. A material penetrating from the outside through the vent opening into the cavity of the hollow handle during welding or a closure element can thus be easily detected.

Preferably the vent opening is configured in the form of a bore or a slit on the at least one handle shell. A defined venting of the hollow handle can thus be achieved in a simple manner.

It is advantageous if the vent opening is formed by not completely welding the at least one handle shell to the instrument shaft and/or at least two handle shells to one another. Configuring the vent opening in this manner has the advantage, in particular, that no additional perforation has to be provided, which simplifies the production of the instrument. The closing off of the vent opening, for example after hardening the instrument by subsequent welding, is then again detectable on the instrument in a simple manner, because this subsequently performed welding was not subjected to a hardening process and therefore differs in its structure from hardened weld seams.

The production of the instrument can be simplified, in particular, by the hollow handle comprising two handle shells, which are configured in the form of half shells. Thus, in particular, a number of weld seams and a length thereof can be minimized overall.

In order to be able to, in particular, ergonomically shape the hollow handle in a simple manner, it is advantageous if the at least one handle shell has a thickness in a range of about 0.5 mm to about 2 mm. In particular, they may have a thickness in a range of about 0.8 mm to about 1.4 mm. For example, the at least one handle shell may be laser cut from a metal sheet with a thickness of about 1 mm and then be brought into the desired shape by deep drawing. During shaping, in particular, a flared rim may be provided on the handle shell(s), which enables the execution of a flange butt edge seam. As a result of such a weld seam geometry, in particular, the introduction of additional welding additive material can be omitted.

In accordance with a further preferred embodiment of the present disclosure, provision may be made that a proximal handle flange and a distal handle flange spaced at a distance therefrom are arranged or formed on the instrument shaft and that the at least one handle shell surrounds the instrument shaft between the proximal and the distal handle flange. The instrument shaft thus extends through the hollow handle over the entire length, such that, as described, an impact pulse acting on the proximal end of the instrument can be transmitted directly through the instrument shaft, i.e., the core of the instrument, to the distal end and the tool element arranged there. The two handle flanges also facilitate the positioning of the at least one handle shell on the instrument shaft and the defined connection thereof to one another and to the instrument shaft.

It is favorable if an annular face facing in the distal direction is arranged or formed on the proximal handle flange, if an annular face facing in the proximal direction is arranged or formed on the distal handle flange, if proximal end faces of the at least one handle shell facing in the proximal direction abut against the proximal handle flange, and if distal end faces of the at least one handle shell facing in the distal direction abut against the distal handle flange. The annular faces configured as described enable a defined positioning of the at least one handle shell on the instrument shaft. They thereby enable a defined and optimal connection of the instrument shaft to the handle shell(s) for forming the hollow handle. For example, a connection between the handle shell(s) and the handle flanges can be achieved by circumferential butt welds by using welding additive.

The instrument can be configured in a simple manner if the vent opening is formed by not completely welding the at least one handle shell to at least one of the two handle flanges. In this way, no additional perforation has to be provided on one of the at least two handle shells. The vent openings configured in that way can then be closed by welding, for example, after hardening the instrument.

In order to be able to form an instrument that is as robust as possible, it is favorable if the instrument is made entirely of one or more metallic materials. Thus, in particular, the instrument shaft with all components formed thereon and the at least one handle shell can be made of a metallic material. In particular, the metallic material may be the same material for all components.

In order to be able to form an optimal impact instrument, it is advantageous if a strike plate is arranged or formed on the proximal end of the instrument and if the strike plate defines the striking face. Thus, impact pulses from a surgeon can be transmitted to the instrument, in particular the instrument shaft thereof, in a simple and secure manner.

The proximal handle flange is preferably arranged or formed on the strike plate or the proximal handle flange forms the strike plate. This configuration simplifies the production of the instrument, because the instrument shaft, in particular in the region of the handle, can be configured as a turned part.

The instrument is preferably of one-part configuration. In particular, it is configured to be non-disassembleable without destroying it. This means that the instrument can be made of a plurality of components. For example, it may be made of an instrument shaft and two half shells, which, however, are permanently and non-releasably connected to one another, in order to thus form a one-part instrument that is non-disassembleable, in particular non-disassembleable for cleaning purposes. Such a one-part instrument can only be disassembled into its starting components by being irreversibly destroyed.

In order to simplify the production of different instruments, it is advantageous if the instrument shaft comprises a handle part and a tool part and if the handle part and the tool part are connected to one another in a force-locking and/or positive-locking and/or materially bonded manner. In particular, the handle part and the tool part are non-releasably connected to one another. This configuration makes it possible, in particular, to combine handle parts and tool parts with one another in any way. For example, instruments can thus be configured with different tool elements, the handle part of which is identically shaped. In particular, differently shaped handle parts, for example optimized for left-handed or right-handed users, can be formed, which then can be connected to corresponding tool parts to form a one-part instrument.

It is advantageous for the configuration of the handle if the proximal handle flange and the distal handle flange are arranged or formed on the handle part. As already mentioned, handle parts with the described hollow handles can thus be formed in a defined manner, for example ergonomically shaped differently or differently sized. Handle elements of that kind can then, in particular, be produced in advance and are connected to the required tool parts with the corresponding tool elements as necessary.

The handle part and the tool part can be permanently connected to one another in a simple and secure manner if they are soldered or welded to one another.

In order to further improve the stability of the instrument and the transmission of impact pulses from the proximal end to the distal end, it is favorable if the strike plate and the handle part are of one-piece configuration. In particular, they may be of monolithic configuration.

Furthermore, it is favorable if the handle part and the proximal handle flange and/or the distal handle flange are of one-piece configuration. In particular, they may be of monolithic configuration. This configuration can be achieved, in particular, by the handle part with the handle flanges being configured as a turned part. Thus, in particular, it may be of completely rotationally symmetrical configuration. An ergonomic shape of the handle can then be achieved by appropriately designing the at least one handle shell.

In accordance with a further preferred embodiment of the present disclosure, provision may be made that the instrument comprises a connecting device with a first connecting element and a second connecting element, that the one of the two connecting elements is arranged or formed on a distal end of the handle part, that the other one of the two connecting elements is arranged or formed on a proximal end of the tool part, and that the first connecting element and the second connecting element in a connecting position are connected to one another in a force-locking and/or positive-locking and/or materially bonded manner. Providing such a connecting device on the instrument has the advantage, in particular, that a standardized connection between the handle part and the tool part is made possible. Thus, differently shaped handle parts with differently shaped tool parts can be coupled to one another and permanently connected to one another in a defined manner. A force-locking and/or positive-locking connection can be achieved, for example, by screwing the connecting elements together. Alternatively or in addition, they may be permanently connected to one another by a material bond like, for example, soldering or welding.

In order to be able to achieve a connection between the handle part and the tool part in a simple manner, it is advantageous if the first connecting element is configured in the form of a connecting receptacle and the second connecting element is configured in the form of a connecting projection corresponding to the connecting receptacle. For example, the connecting elements may have, relative to a longitudinal axis of the instrument, a sufficient length in the region of the connecting device in order to form an instrument that is sufficiently resistant to torsion and bending, which is particularly advantageous for a stability of the instrument, in particular in the case of a two-part configuration of the instrument shaft.

It is favorable if formed on the instrument is a ventilation opening that fluidically connects the connecting receptacle to an environment of the instrument, and if the ventilation opening is closed, in particular in a gas-tight manner. The ventilation opening may, in particular, be fluidically connected to a cavity of the hollow handle. Thus, instead of one of the vent openings described above, the ventilation opening may also serve to ventilate the cavity, in particular when hardening the instrument, and to prevent an undesired deformation of the at least one handle shell during hardening.

The ventilation opening is advantageously formed on the handle part or on the tool part. For example, on the tool part, it may open a longitudinal channel on the connecting element of the tool element, which connecting channel is in fluidic connection with the cavity of the hollow handle by way of a transverse connection when the tool part and the handle part are connected to one another.

In order to achieve a high resistance of the instrument to corrosion, it is favorable if the instrument shaft and/or the handle and/or the tool element are made of a stainless steel. In particular, all stated components may be made from the same steel. Thus, no color differences can arise, as is the case when using different materials.

In order to improve an impact resistance of the hollow handle, it is advantageous if the stainless steel is a chromium steel. In particular, it may be made of a martensitic chromium steel. A risk of damage when the handle is laterally stressed can thus be minimized.

The stainless steel is preferably a hardenable steel. The impact resistance of the at least one handle shell can therefore be increased in a simple manner by hardening.

It is particularly advantageous if the stainless steel is the material 1.4021 in accordance with DIN EN 10088. This material can be shaped, in particular, to metal sheets and be brought into the desired shape by deep drawing. Furthermore, it is hardenable by thermal treatment at about 1000° C.

The instrument is preferably hardened. A good resistance to corrosion can thus be achieved. This can still be improved, in particular, by corresponding surface treatment after hardening.

To form chisels or osteotomes, it is favorable if the tool element comprises a cutting edge pointing in the distal direction.

The handling of the instrument can be further improved for a surgeon if the hollow handle is ergonomically shaped. For example, it may be differently shaped for being held by left-handed and right-handed users.

In accordance with a further preferred embodiment of the present disclosure, the instrument may be configured in the form of a chisel, a cement removal chisel, an osteotome, a hollow chisel, a dislocation lever, an extraction instrument for prostheses, or a tamper. The described configurations of the instrument enables versatile use in cases where there are high impact stresses and also instruments with very long service lives must be used.

The present disclosure further relates to a method for producing a medical instrument, in particular an impact instrument, with a proximal end and a distal end, wherein a handle and a striking face facing in the proximal direction are arranged or formed on the proximal end, wherein a tool element is arranged or formed on the distal end, and wherein an instrument shaft of the instrument extends from the proximal end to the tool element, wherein the handle is configured in the form of a hollow handle.

As already explained in detail, medical instruments with stable but light handles can thus be formed. In addition, they make it possible to pass impact pulses directly from the proximal end to the tool element arranged or formed on the distal end. The configuration of the hollow handle also makes it possible to form material-saving and thus resource-saving ergonomic handles in a simple manner.

It is favorable if the hollow handle is made from at least one, in particular two, handle shells surrounding the instrument shaft and if a cavity is formed between the at least one handle shell and the instrument shaft. In particular, the cavity may be configured in the form of an annular space. A handle shell may be formed, for example, from a hollow piece by so-called hydroforming. Providing two, three, or more handle shells for forming the hollow handle simplifies the production of the instrument. In particular, handle shells of that kind can be brought laterally up to an instrument shaft and be connected thereto. Due to the resulting cavity, weight can be advantageously saved for a user in the region of the handle.

It is advantageous if the cavity is closed in a gas-tight manner. In particular, it can be closed by welding and/or by a closure element. As already explained, an optimal cleaning and reprocessing of the instrument can be ensured, because germs can neither enter nor escape the cavity.

In accordance with a preferred embodiment of the present disclosure, provision may be made that formed on the instrument is a vent opening that fluidically connects the cavity of the hollow handle to the environment of the instrument, and that the vent opening is closed. In particular, it may be closed in a gas-tight manner. In particular, the vent opening has the advantage with respect to manufacturing that no overpressure as a result of air trapped in the cavity of the hollow handle can arise when hardening the instrument at high temperatures, whereby an outer contour of the at least one handle shell cannot change in an undesirable manner, in particular by deforming. By closing the vent opening, as mentioned, it is ensured, in particular, that no germs are able to enter the cavity, thereby enabling a secure and durable processing and use of the instrument.

The vent opening can be closed in a simple manner with a closure element and/or by soldering or welding. In particular, a gas-tight closure of the cavity can thus be achieved. In addition, the proposed approach is favorable because only one small vent opening is required to be able to ensure a pressure equalization between the cavity and an environment of the instrument when hardening at high temperatures. It can thus be avoided that a large portion of possible weld or solder joints are not hardened.

For example, the vent opening is configured in the form of a bore or a slit on the at least one handle shell. Vent openings of that kind can be produced in a simple manner.

It may be favorable, in particular, if the vent opening is formed by not completely welding the at least one handle shell to the instrument shaft and/or at least two handle shells to one another. A vent opening formed in that way has the advantage, in particular, that no additional working steps are required to form it, for example by drilling or milling. Thus, in particular, the at least one handle shell can be used completely undamaged and unchanged to form the hollow handle.

It is advantageous if a proximal handle flange and a distal handle flange spaced at a distance therefrom are arranged or formed on the instrument shaft and if the at least one handle shell is arranged surrounding the instrument shaft between the proximal and the distal handle flange. Configuring the two handle flanges in the described manner enables, in particular, a defined positioning of the at least one handle shell on the instrument shaft for connecting it thereto. The production of the instrument is thereby simplified significantly.

In order to further simplify an optimal positioning of the at least on handle shell on the instrument shaft, it is favorable if an annular face facing in the distal direction is arranged or formed on the proximal handle flange, if an annular face facing in the proximal direction is arranged or formed on the distal handle flange, if proximal end faces of the at least one handle shell facing in the proximal direction are placed against the proximal handle flange, and if distal end faces of the at least one handle shell facing in the distal direction are placed against the distal handle flange. The configuration of the described annular faces enables a defined positioning of the at least one handle shell on the instrument shaft. A connection of the at least one handle shell to the instrument shaft is thereby simplified.

The vent opening can be formed in a simple manner by not completely welding the at least one handle shell to at least one of the two handle flanges. For example, to form the vent opening, a weld seam annularly surrounding the instrument shaft for connecting the at least one handle shell to one of the two handle flanges shaft can be not completely closed.

In order to be able to form instruments that are sufficiently stable for use as impact instruments, it is favorable, in particular, if the instrument is made entirely of one or more metallic materials. In particular, a uniform coloration of the instrument can be achieved if it is made of only one single metallic material. In other words, all components of the instrument can be made from the same metallic material.

So that the stability of the instrument can be further improved, it is advantageous if a strike plate is arranged or formed on the proximal end of the instrument, which defines the striking face. In particular, the strike plate may be formed in one piece with the instrument shaft so that the instrument shaft can be produced with the strike plate, for example as a turned part.

In order to be able to form instruments that are particularly resistant to torsion, bending, and impact, it is favorable if the instrument is formed in one part. It in particular, it is advantageous if it is of non-disassembleable configuration, such that it can only be separated into its original components by destroying it. In this way, in particular, it can be ensured that the instrument cannot undesirably disassemble into its individual parts during use.

In order to simplify the production of the instrument, it is advantageous if the instrument shaft is made of a handle part and a tool part and if the handle part and the tool part are connected to one another in a force-locking and/or positive-locking and/or materially bonded manner. In particular, the handle part and the tool part may be non-releasably connected to one another. Non-releasably in this sense means, in particular, that a release of the parts from one another can be achieved only by destroying the instrument as a whole. Forming the instrument shaft from two parts enables a higher variability in the production of medical instruments, because handle parts and tool parts can be selectively connected to one another as required and, in principle, in any way. In particular, this can be achieved by a standardized connection between the handle part and the tool part.

The proximal handle flange and the distal handle flange are advantageously arranged or formed on the handle part. The handle part can thus be formed completely with the hollow handle. Such a handle part can then be connected to different tool parts that have different tool ends, for example by welding and/or screwing.

The handle part and the tool part can be soldered or welded to one another in a simple and secure manner.

The strike plate and the handle part are preferably formed in one piece, in particular monolithically. Such a production can be achieved, in particular, by forming a turned part. Assembly steps in the production of the instrument can thus be reduced.

Furthermore, it may be advantageous if the handle part and the proximal handle flange and/or the distal handle flange are formed in one piece, in particular monolithically. The handle part can thus, in particular, be made from one piece, except for the at least one handle shell. Impact pulses can then be transmitted via the strike plate through the hollow handle in the distal direction toward the tool part.

With respect to manufacturing, it is favorable, in particular, if the instrument is configured with a connecting device, which comprises a first connecting element and a second connecting element, if the one of the two connecting elements is arranged or formed on a distal end of the handle part, if the other one of the two connecting elements is arranged or formed on a proximal end of the tool part, and if the first connecting element and the second connecting element in a connecting position are connected to one another in a force-locking and/or positive-locking and/or materially bonded manner. A connecting device of that kind makes it possible, in particular, to connect tool parts to an associated handle part in a defined and standardized manner. In particular, any handle parts and any tool parts may each be formed with identical connecting elements, which allow for any combination of handle parts and tool parts and the defined connection thereof.

The connecting elements can be brought into engagement with one another in a simple manner if the first connecting element is configured in the form of a connecting receptacle and the second connecting element is configured in the form of a connecting projection corresponding to the connecting receptacle. Thus, during production, the same production step for connecting the two parts can always be performed, independent of the design of the tool part and the handle part.

It is favorable if formed on the instrument is a ventilation opening that fluidically connects the connecting receptacle to an environment of the impact instrument, and if the ventilation opening is closed, in particular in a gas-tight manner. The closing of the ventilation opening may take place, in particular, after a hardening of the instrument. By way of the ventilation opening, for example, a fluidic connection to the cavity of the hollow handle can be produced in order to prevent a deformation of the at least one handle shell during hardening as described.

The ventilation opening is preferably formed on the handle part or on the tool part. This makes it possible, in particular, to form the ventilation opening where it is most easily achievable with respect to production and also does not negatively affect a stability of the instrument.

It is favorable if the instrument shaft and/or the handle and/or the tool element are made of a stainless steel. Thus, in particular, a high resistance of the instrument to corrosion can be ensured.

In order to further improve the resistance of the instrument to corrosion, it is advantageous if a chromium steel is used as the stainless steel. In particular, a martensitic chromium steel may be used. A chromium steel of that kind can be hardened, in particular, by a thermal treatment, which helps to further improve the stability of the instrument.

A hardenable steel is preferably used as the stainless steel. As already mentioned, stability and service life of the instrument can thus be further improved.

The production of the instrument, in particular the hollow handle, can be simplified if the material 1.4021 in accordance with DIN EN 10088 is used as the stainless steel. Such a material is somewhat less hard in comparison to the material 1.4301 at a thermal treatment temperature of about 1000° C., but after thermal treatment is significantly harder and thus less susceptible to undesired deformation as a result of a lateral impact load on the hollow handle, in particular the at least one handle shell thereof.

For increasing a stability and a resistance of the instrument to corrosion, it is advantageous if the instrument is hardened. By hardening the metallic material in the described manner, in particular, handle shells with a reduced thickness can be used. This simplifies the reshaping, for example by deep drawing punched sheet metal, without significantly or at all sacrificing impact stability in the region of the handle.

The instrument is preferably hardened at a temperate of about 1000° C. In particular, the material 1.4021 can thus be significantly increased in its impact resistance.

It is advantageous if the instrument is hardened after the connection of the handle part and the tool part. In this way, in particular, a joint between handle part and tool part can be improved in its stability.

It is favorable if the instrument is hardened after the connection of the at least one handle shell to the instrument shaft. In this way, the connection between the handle shell(s) and the instrument shaft is also hardened, i.e., in particular weld seams. A stability and resistance of the instrument to corrosion can thus be improved in a desired manner.

In accordance with a further preferred embodiment of the present disclosure, provision may be made that the vent opening and/or the ventilation opening is/are closed after hardening. The stated openings no longer have a function after hardening, such that they can be closed to improve a cleanability of the instrument.

A uniform appearance of the instrument can be achieved, in particular, by it being surface treated. In particular, it may be polished. Thus, in particular when appropriately selecting one single uniform material for all components of the instrument, a uniform appearance can be obtained and the occurrence of color differences can be avoided.

The surface treatment can be performed in a simple manner by means of belt grinding. In particular, such a process may also be performed by machine and fully automatically.

Schematically depicted in FIG. 1 is a first embodiment of a medical instrument 10. It is configured in the form of an impact instrument 14, namely as a chisel 12.

The instrument 10 defines a proximal end 16, commencing from which a handle 20 extends in the distal direction. The proximal end 16 is defined by a striking face 18 facing in the proximal direction.

An instrument shaft 22 extends from the proximal end 16 to a distal end 24 of the instrument 10 on which a tool element 26 with a cutting edge 28 pointing in the distal direction is formed.

The instrument shaft 22 defines a longitudinal axis 30.

The handle 20 is configured in the form of a hollow handle 32, the structure of which is described in detail in the following.

The instrument shaft 22 comprises a handle part 34 and a tool part 36, which are connected to one another in a force-locking, positive-locking, and materially bonded manner. In the embodiment depicted in FIG. 1, the handle part 34 and the tool part 36 are non-releasably connected to one another. Non-releasable in this sense means that the handle part 34 and the tool part 36 are releasable from one another only by destroying the instrument 10.

The tool part 36 is of one-piece, namely monolithic, configuration.

The instrument 10 comprises a connecting device 38 with a first connecting element 40 and a second connecting element 42.

The first connecting element 40 is formed on a distal end 44 of the handle part 34. The second connecting element 42 is formed on a proximal end 46 of the tool part 36.

As is schematically depicted in FIG. 1, the first connecting element 40 and the second connecting element 42 in a connecting position are in engagement or connected with one another in a force-locking, positive-locking, and materially bonded manner.

The first connecting element 40 is configured in the form of a connecting receptacle 48, namely in the form of a blind hole 50.

The second connecting element 42 is configured in the form of a connecting projection 52, namely corresponding to the connecting receptacle 48.

The connecting receptacle 48 is formed coaxially to the longitudinal axis 30 and is open pointing in the distal direction. The connecting projection 52 points in the proximal direction and can be inserted into the connecting receptacle 48. Both the connecting projection 52 and the connecting receptacle 48 are of rotationally symmetrical configuration relative to the longitudinal axis 30.

The connecting projection 52 projects from a flange-like stop 54 in the proximal direction and is surrounded by an annular face 56 defined by the stop 54, said annular face 56 extending transversely, namely perpendicularly in the embodiment depicted in FIG. 1, to the longitudinal axis 30 and faces in the proximal direction. It forms a stop for an annular face 58 facing in the distal direction, which defines the distal end 44 of the handle part 34. The annular face 58 is formed on a distal handle flange 60 of the handle part 34.

Formed on a cylindrical shaft portion 62 of the handle part 34 on the proximal side is a strike plate 64, which defines a proximal handle flange 66. A side face of the strike plate 64 facing in the proximal direction defines the striking face 18.

The proximal handle flange 66 and the distal handle flange 60 are therefore arranged or formed at a distance from one another on the instrument shaft 22.

Formed on the distal handle flange 60 is a set-back portion, which defines an annular face 68 facing in the proximal direction. In a similar manner, an annular face 70 facing in the distal direction is formed on the proximal annular flange 66.

For forming the hollow handle 32, the instrument 10 comprises a plurality of handle shells 72. In the embodiment depicted in FIG. 1, two handle shells 72 in the form of half shells 74 are provided. The two half shells 74 surround the instrument shaft 22 in the region of the shaft portion 62.

A wall 76 defined by the handle shells 72 has a thickness 102 of about 1 mm. The handle shells are laser cut from a sheet metal blank and are brought into a desired ergonomic shape by deep drawing.

The half shells 74 surround the shaft portion 62 at a distance, such that a hollow space 78 is formed, which is delimited by the half shells 74 in the radial direction away from the longitudinal axis 30, on the proximal side by the proximal handle flange 66 and on the distal side by the distal handle flange 60. Furthermore, the annular space is delimited in the direction toward the longitudinal axis 30 by an outer side of the shaft portion 62.

The half shells 74 have proximal end faces 80 facing in the proximal direction and distal end faces 82 facing in the distal direction. The spacing of the handle flanges 60 and 66 is dimensioned such that the proximal end faces 80 abut against the annular face 70 of the proximal handle flange 66, the distal end faces 82 against the annular face 68 of the distal handle flange 60 facing in the proximal direction.

Rims of the half shells 74 are flanged, i.e., provided with a flange-like flared rim 84. The flared rims 84 extending in the longitudinal direction abut against one another in surface-to-surface contact. The flared rims that point in the distal and proximal direction define the distal end faces 82 on the one hand and the proximal end faces 80 on the other hand.

Commencing from the proximal end 16 of the instrument, a cross section of the hollow handle 32 increases in the distal direction, namely continuously up to a maximum that is formed somewhat closer towards the proximal handle flange 66 than to the distal handle flange 60. Commencing from the maximum, the cross section of the hollow handle 32 decreases continuously up to a minimum cross section, which is formed closer to the distal handle flange 60 than the maximum to the proximal handle flange 66. From the minimum, which defines a relative minimum of a cross sectional area of the hollow handle 32, the cross section increases again up to a relative maximum 86 of the cross sectional area, which is formed near the distal end face 82. The relative maximum 86 forms a sort of anti-slip means for a thumb of an operator.

The handle shells 72 are provided with a plurality of grooves 88 extending in the circumferential direction relative to the longitudinal axis 30, which have a different length and extend over a circumferential angle relative to the longitudinal axis 30 that is in a range between 60° and 150°.

The handle part 34 is configured as a turned part made of the material 1.4021. It is a hardenable, martensitic stainless steel. On one of the two half shells 74, formed in the region between the relative maximum 86 and the distal end face 82 is a vent opening 90 in the form of a bore 92.

For forming the hollow handle 32, the two half shells 74 are arranged surrounding the handle part 34 between the annular faces 68 and 70, such that the flared rims 84 that extend in the longitudinal direction abut against one another, and the flared rims 84, defining the end faces 80 and 82, on the half shells 74 abut against the annular faces 68 and 70. The handle shells 72 are welded along the flared rims 84 with a flange butt edge seam. As a result of this particular weld seam geometry, the introduction of additional welding additive material can be omitted.

The half shells 74 are connected to one another by welding on the proximal side and distal side with circumferential butt welds using welding additive.

The tool part 36 is also made of the material 1.4021. The connecting elements 40 and 42 are brought into engagement with one another and the handle part 34 is welded to the tool part 36 in the region of the connecting device 38, namely by a circumferential weld seam in the region of the abutting annular faces 56 and 58.

The instrument 10 is thus basically fully formed, namely in a form as schematically depicted in FIG. 1.

To increase an impact resistance of a sleeve of the hollow handle 32 defined by the handle shells 72, the instrument 10 formed by welding its components as described is hardened. In order to allow the air contained in the cavity 78, which defines an annular space 94, to expand during the hardening process that is performed at a temperature of about 1000° C., the vent opening 90 is provided. It prevents the half shells 74 defining a hollow handle 32, which is substantially oval in cross section, from deforming as a result of an arising overpressure in the annular space 94 and thereby approaching a cylindrical outer contour.

The vent opening 90 fluidically connects the cavity 78 to an environment 100 of the instrument.

Figure 7:
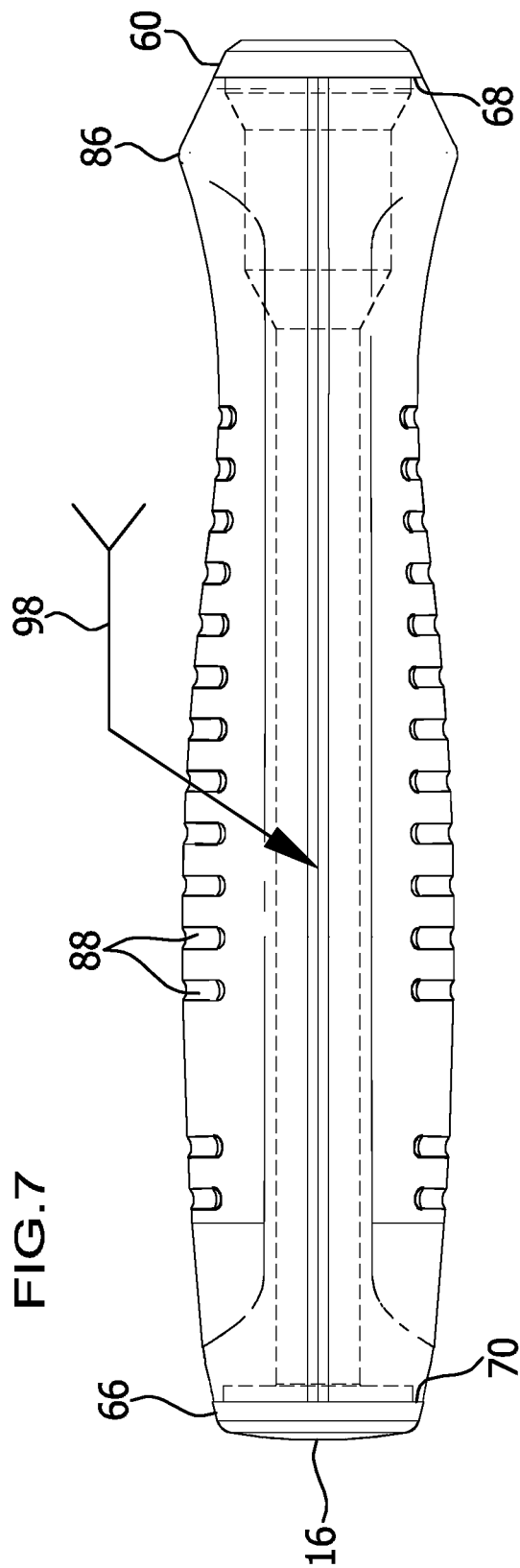
FIG. 7 shows a partially broken side view of the handle part from FIG. 6 in the direction of arrow B.
Figure 11:
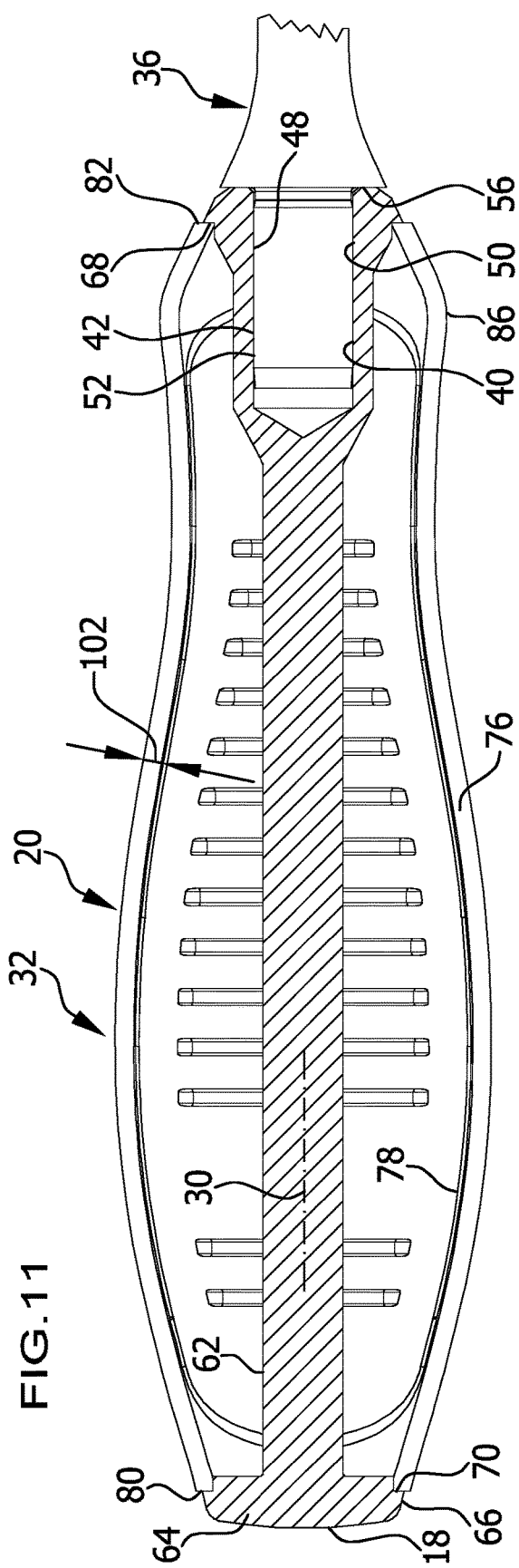
FIG. 11 shows a schematic longitudinal cut view of a further embodiment of a medical instrument in the region of the handle part.

After hardening the instrument 10, the vent opening 90 is closed with welding additive, as is schematically depicted in FIG. 10. The welding additive in the vent opening 90 forms a closure element 96, which closes the cavity 78. If all weld seams that are denoted in FIGS. 6 and 7 by the arrows 98 are of gas-tight configuration, the annular space 94 as a whole can be closed in a gas-tight manner by the closure element 96.

In an alternative embodiment, the closure element 96 is formed by a metal pin, which, after hardening the instrument 10, is inserted into the vent opening 90 and connected to the instrument 10 by welding.

The described embodiment of the instrument 10 is made entirely of one single metallic material.

In alternative embodiments, individual components, for example the handle shells 72, may be made of a different material than, for example, the handle part 34 and the tool part 36.

The described embodiment of the instrument 10 is formed in one part. As a result of the described connection of the components of the instrument 10 by means of welding, it is thus non-disassembleable. Non-disassembleable means here that, as intended, a separation into its original components is not possible without destroying the instrument 10.

The described embodiment of the instrument 10 has a high impact resistance and also a high resistance to corrosion. Impact pulses exerted, e.g., by a hammer on the striking face 18 are passed through the instrument shaft 22 directly to the tool element 26.

After closing the vent opening 90, an outer surface of the instrument 10 may be surface treated, for example by grinding or polishing, in particular belt grinding. As a result of such a reworking of the instrument 10, neither protrusions from welding nor annealing colors remain.

In an alternative embodiment, the closure element 96 may be configured, e.g., in the form of a wire pin, which is circumferentially welded on the surface, in particular to one of the handle shells 72. For welding the components to one another, in particular for closing the vent opening 90, tungsten inert gas welding and laser beam welding are selectively used.

A further embodiment of a tool part 36 for forming an instrument 10 is schematically depicted in FIG. 2. The tool element 26 on the distal end of the tool part 36 is configured in the form of a narrow chisel tip with a cutting edge 28 pointing in the distal direction. Formed laterally on the tool element 26 is a pin-shaped spacer element 104, which has a cylindrical body and a spherically rounded end 106, which points in the distal direction.

On the proximal side, the design of the tool part 36 from FIG. 2 corresponds with the embodiment of the tool part 36 from FIG. 1, such that the tool part 36 can, in an analogous manner as described above for the tool part 36 according to the embodiment from FIG. 1, be connected to the hollow handle 32 to form a medical instrument 10 in the form of a cement removal chisel.

For easier orientation, in the embodiment of FIG. 2, as well as in the embodiment of FIG. 3, which will be described in the following, identical reference numerals are used for identical components and elements on the tool parts 36.

Depicted in FIG. 3 is a further embodiment of a tool element 36 for forming a surgical instrument 10. A distal end of the tool part 36 forms a narrow, slightly arched chisel tip, which has a cutting edge 28 on the distal side.

On the proximal side, the tool part 36 from FIG. 3 is of substantially identical configuration with the proximal end of the tool parts 36 according to the embodiments of FIGS. 1 and 2. However, there is a difference here, namely a ventilation opening 108 in the form of a bore, which extends transversely to the longitudinal axis 30, which fluidically connects an environment 100 of the instrument 10 to a blind hole 112, which opens the connecting projection 52 in the proximal direction. The ventilation opening 108 is arranged near a distal end 114 of the blind hole 112.

The ventilation opening 108 serves the same purpose as the vent opening 90, which was explained above in connection with the hollow handle 32 described in FIGS. 1 and 4 to 11.

For producing a fluidic connection between the environment 100 and the cavity 78, an opening 116 transverse to the longitudinal axis 30 is formed near a proximal end of the connecting receptacle 48, which opening 116 fluidically connects the connecting receptacle 48 to the cavity 78. The connecting device 38 is thereby designed in such a way that a proximal end 46 of the connecting projection 52 leaves the opening 116 at least partially open, such that air expanding in the cavity 78 during the hardening of the instrument after connecting the hollow handle 32 to a tool part 36 is able to escape through the opening 116, the connecting receptacle 48, the blind hole 112, and the ventilation opening 108 into the environment 100.

Figure 12:
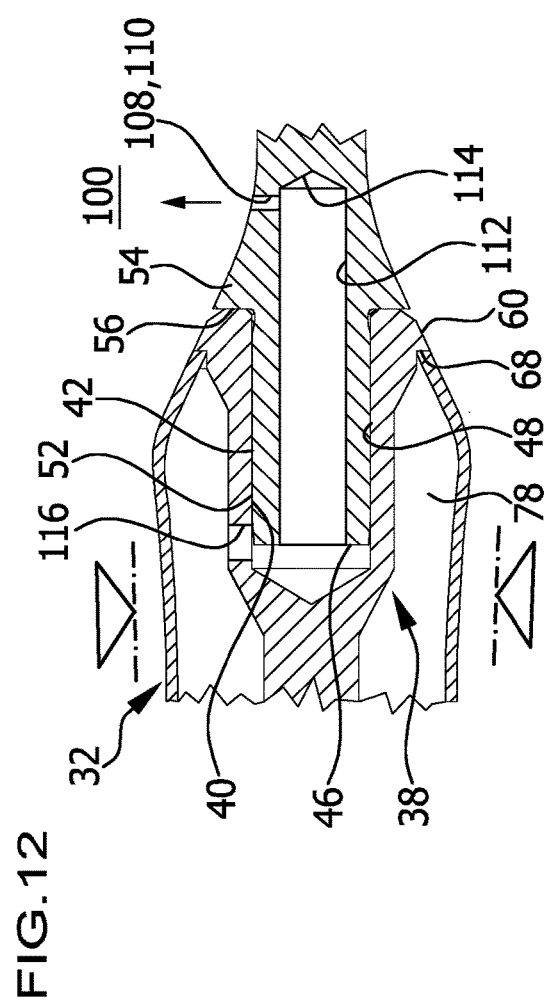
FIG. 12 shows a cut view along line 12-12 of the tool part from FIG. 3 with a coupled handle part.

The hollow handle 32 partially depicted in FIG. 12 is otherwise of identical configuration with the hollow handle depicted in FIGS. 1 and 4 to 11.

In a further embodiment, the vent opening 90 is not configured in the form of a bore 92, but instead in the form of a slit 120. The function of an appropriately arranged slit then corresponds to the function of the bore 92 described above. As an example, such a slit 120 is drawn with a dashed line in the embodiment depicted in FIG. 13.

Furthermore, alternatively to the configuration of a vent opening 90 in the form of a bore 92 already described above, it is also possible to not completely weld the flared rims 84 to one another and to the annular faces 68 and 70, but instead to not weld a short portion at any point of the weld seam to be formed. Then a narrow slit or gap remains at the point where no weld seam is formed. Such an incomplete weld seam is suited to reduce an overpressure of air located in the cavity 78 by flowing out toward the environment 100 of the instrument 10.

Schematically depicted in FIGS. 13 and 14 is a further embodiment of a medical instrument 10. It comprises a handle part 34 and a tool part 36 connected thereto. The design of the handle part 34 corresponds substantially to the structure of the handle parts described in FIGS. 1 and 4 to 12, but differs in the design of the proximal handle flange 66. In this embodiment, a distance between the annular face 70 and the striking face 18 is significantly larger than in the case of the proximal handle flange 66, for example as it is depicted and described in the case of the embodiment in FIG. 4.

On the proximal side of the annular face 70, the proximal annular flange 66 is provided with a transverse bore 118.

The hollow handle 32 of the embodiment depicted in FIGS. 13 and 14 is also produced in an analogous manner as explained above in connection with FIGS. 1 to 11, and is selectively connected to a tool part 36. For venting the cavity 78 of the hollow handle 32, either a vent opening 90 is provided, for example in the form of a bore 92 or alternatively in the form of a slit, which are closed after hardening the instrument. Alternatively, a weld seam is not completely closed for forming a vent opening 90. The weld seam is then closed by welding after hardening. In this embodiment, too, a surface treatment by polishing or belt grinding can finally be performed, such that, in particular, subsequent welding work for closing the vent opening 90 or the ventilation opening 108 from the outside is no longer visible on the instrument 10.

In the manner as described in detail, one-part medical instruments with a high stability and high resistance to corrosion can thus be formed.

All components of the different embodiments of instruments 10 described above are made of a metallic material. In the described embodiments, this is the material 1.4021.

What is claimed is:

1. A medical instrument with a proximal end and a distal end, wherein a handle and a striking face facing in a proximal direction are arranged or formed on the proximal end, wherein a tool element is arranged or formed on the distal end, and wherein an instrument shaft of the medical instrument extends from the proximal end to the tool element, wherein the handle is configured in the form of a hollow handle;
   wherein the instrument shaft comprises a handle part and a tool part and wherein the handle part and the tool part are connected to one another in at least one of a force-locking and positive-locking and materially bonded manner; and
   wherein the medical instrument comprises a connecting device with a first connecting element and a second connecting element, wherein the first connecting element is arranged or formed on a distal end of the handle part, wherein the second connecting element is arranged or formed on a proximal end of the tool part, and wherein the first connecting element and the second connecting element in a connecting position are connected to one another in a force-locking and/or positive-locking and/or materially bonded manner.

2. The medical instrument according to claim 1, wherein the hollow handle comprises at least one handle shell surrounding the instrument shaft and wherein a cavity is formed between the at least one handle shell and the instrument shaft.

3. The medical instrument according to claim 2, wherein the medical instrument comprises a vent opening that fluidically connects the cavity of the hollow handle to an environment of the medical instrument and wherein the vent opening is closed.

4. The medical instrument according to claim 3, wherein the at least one handle shell comprises two handle shells, which are configured in the form of half shells.

5. The medical instrument according to claim 2, wherein the at least one handle shell has a thickness in a range of about 0.5 mm to about 2 mm.

6. The medical instrument according to claim 2, wherein a proximal handle flange and a distal handle flange spaced at a distance from the proximal handle flange are arranged or formed on the instrument shaft and wherein the at least one handle shell surrounds the instrument shaft between the proximal end and the distal handle flange.

7. The medical instrument according to claim 2, wherein the cavity is closed in a gas-tight manner.

8. The medical instrument according to claim 1, wherein at least one of:
   a) the medical instrument is made entirely of one or more metallic materials; or b) a strike plate is arranged or formed on the proximal end of the medical instrument and wherein the strike plate defines the striking face.

9. The medical instrument according to claim 1, wherein the medical instrument is of one-part configuration.

10. The medical instrument according to claim 1, wherein at least one of:
   a) a proximal handle flange and a distal handle flange are arranged or formed on the handle part;
   b) the handle part and the tool part are soldered or welded to one another; or
   c) a proximal handle flange and a distal handle flange are arranged or formed on the handle part, and the handle part and the proximal handle flange and/or the distal handle flange form a one-piece monolithic body of unitary construction.

11. The medical instrument according to claim 1, further comprising a ventilation opening that fluidically connects the first connecting element to an environment of the medical instrument and wherein the ventilation opening is closed.

12. The medical instrument according to claim 1, wherein at least one of:
   a) at least one of the instrument shaft, the handle, and the tool element are made of a stainless steel and wherein the stainless steel is a hardenable steel;
   b) the medical instrument is hardened; or
   c) the hollow handle is ergonomically shaped.

13. A method for producing a medical instrument that comprises a proximal end and a distal end, the method comprising the steps of:
   a) arranging a handle and a striking face to face in a proximal direction on the proximal end; and
   b) arranging a tool element on the distal end,
   wherein an instrument shaft of the medical instrument extends from the proximal end to the tool element, and wherein the handle is configured in the form of a hollow handle,
   wherein the instrument shaft is made from a handle part and a tool part and wherein the handle part and the tool part are connected to one another in a force-locking and/or positive-locking and/or materially bonded manner, and
   wherein the medical instrument is provided with a connecting device with a first connecting element and a second connecting element, wherein the first connecting element is arranged or formed on a distal end of the handle part, wherein the second connecting element is arranged or formed on a proximal end of the tool part, and wherein the first connecting element and the second connecting element are connected to one another in a force-locking and/or positive-locking and/or materially bonded manner in a connecting position.

14. The method according to claim 13, wherein at least one of:
   a) the hollow handle is made from at least one handle shell surrounding the instrument shaft and a cavity is formed between the at least one handle shell and the instrument shaft;
   b) a vent opening that fluidically connects a cavity of the hollow handle to an environment of the medical instrument is formed on the medical instrument and wherein the vent opening is closed;
   c) a vent opening that fluidically connects a cavity of the hollow handle to an environment of the medical instrument is formed on the medical instrument and wherein the vent opening is closed, and the vent opening is configured as a bore or a slit on the at least one handle shell; or
   d) the hollow handle is made from at least one handle shell surrounding the instrument shaft and a cavity is formed between the at least one handle shell and the instrument shaft, and a vent opening is formed by not completely welding at least one of the at least one handle shell to the instrument shaft and at least two handle shells to one another.

15. The method according to claim 14, wherein a proximal handle flange and a distal handle flange spaced at a distance from the proximal handle flange are arranged or formed on the instrument shaft and wherein the at least one handle shell is arranged surrounding the instrument shaft between the proximal handle flange and the distal handle flange.

16. The method according to claim 13, wherein at least one of:
   a) the medical instrument is made entirely of one or more metallic materials;
   b) a strike plate is arranged or formed on the proximal end of the medical instrument, the strike plate defining the striking face; or
   c) the medical instrument is of one-part configuration.

17. The method according to claim 13, wherein the instrument shaft and/or the handle and/or the tool element are made of a stainless steel.

18. The method according to claim 13, wherein the medical instrument is at least one of:
   a) hardened at a temperature of about 1000° C.;
   b) hardened after connecting the handle and the tool element; or
   c) hardened after connecting at least one handle shell to the instrument shaft.

* * * * *